United States Patent Office 2,988,520
Patented June 13, 1961

2,988,520
ALUMINA COMPOSITIONS AND PROCESS FOR THE PREPARATION THEREOF
David G. Braithwaite, Chicago, Ill., assignor to Nalco Chemical Company, a corporation of Delaware
No Drawing. Continuation of application Ser. No. 301,981, July 31, 1952. This application Nov. 9, 1955, Ser. No. 546,007
11 Claims. (Cl. 252—455)

This invention relates to alumina compositions and a process for the preparation thereof.

It is well known in the catalyst art to use alumina or combinations of alumina and silica as carriers or extenders for various types of catalysts. Despite the fact that the alumina or combinations of alumina and silica used for this purpose has been prepared in many different ways, the physical characteristics of the resultant alumina or alumina-silica compositions have left much to be desired. This is particularly true where the alumina or combinations of alumina and silica are used in the so-called fluidized catalytic processes as distinguished from the fixed bed catalytic processes.

In the fluidized catalytic processes the catalyst is in suspension in the reactant gases or vapors and due to the fact that it is constantly being circulated it is subjected to attrition. Many catalysts which are supported on alumina or alumina-silica bases do not satisfactorily withstand this attrition.

One of the objects of the present invention is to prepare alumina, with or without other oxides, in a microspherical glass-like form having satisfactory attrition characteristics.

Another object of the invention is to provide a glass-like alumina-silica in microspherical form, with or without other oxides, having satisfactory attrition characteristics.

A further object of the invention is to provide a new and improved method for producing alumina or alumina-silica compositions characterized by the fact that the resultant product is essentially a clear glass-like material in microspherical form with substantially no opaque particles and no interfaces between different phases of the microsphere which would tend to produce a weaker particle, and further characterized by the fact that the glass-like microspheres exhibit true alumina gel characteristics such as high surface area, optimum pore volume and satisfactory density, as differentiated from the glass-like fused alumina microspheres which have low surface area, poor pore volume, and unsatisfactory density.

Another object is to produce new and useful alumina, or alumina-silica compositions, with or without other oxides, and to provide a new and improved process for producing such compositions. Other objects will appear hereinafter.

In accordance with the invention these objects are accomplished by preparing a new and improved form of alumina or alumina in combination with silica, with or without the addition of catalytic agents, by a procedure which involves the following steps:

(1) The alumina or alumina and silica are precipitated from an alkaline aqueous solution at a pH between about 8 and 12.0, and preferably 9 and 10.5.

(2) The concentrations of the reactants employed are controlled and the concentration of alumina in the final slurry is preferably within the range of 1 to 2.5% as $Al_2O_3$. At these preferred concentrations a satisfactory product can be obtained in the aforementioned pH range. The concentrations of alumina can be as high as 5 or 6% as $Al_2O_3$ in the final slurry but the pH control in such event is more critical and must be in the upper part of the pH range, preferably in excess of pH 10, otherwise any subsequent filtration is exceedingly difficult.

(3) The slurry obtained from Step (2) is preferably filtered to increase the concentration of the alumina solids to 4 to 7% as $Al_2O_3$. This filtration step is optional but is particularly important where it is desired to produce microspheres having a particle size within the range of 20 microns to 100 microns, which is a desirable particle size for fluidized catalysts. The filtering step also effects about an 80% purification of the alumina which enhances the formation of a continuous phase in the microspherical particles that are subsequently formed. It should be understood, however, that the removal of the soluble salts by this filtration step is not necessary to the formation of a continuous phase in the microspherical particles. If the slurry which is produced in Step (2) contains 1.0 to 2.5% of alumina the filtration will ordinarily produce a filter cake containing up to 6 or 7% alumina, the remainder being mother liquor. If the slurry is filtered and it is desired to spray dry the filter cake, the latter should be reslurried with enough water to produce a pumpable mixture. In general, the concentration of the slurry to be spray dried should be at least 3.5%, calculated at $Al_2O_3$, in order to obtain substantial quantities of microspherical particles within the 20 to 100 micron size range.

(4) One of the essential reactants is an alkali-soluble aluminate, for example, sodium aluminate. If it is desired that the resultant product also contain silica one of the essential reactants is a silica-forming compound, for example, an alkali-soluble silicate, e.g., sodium silicate or a silicon tetrahalide, e.g., silicon tetrachloride, in proportions required to give the desired $SiO_2$ content. If a silicon tetrahalide is used as the source of the silica it is preferably added to the acidic reagent and hydrolyzes during the preparation of the batch.

(5) The acidic reagent which is added to precipitate the alumina in hydrous form from the alkaline aqueous aluminate solution is preferably an acidic aluminum salt, for example, aluminum sulfate. Aluminum chloride and other aluminum salts of acids whose anions form alkali-soluble salts with aluminum, and the free acids themselves, can be used as the acidic reagents to bring about the precipitation of the alumina but the aluminum sulfate is preferred because of the excellent results obtained by its use and its low cost and ready availability. Aluminum chloride is more expensive and more difficult to handle. The free acids are less expensive but present problems due to localized action. If free acids are used they should be diluted and added to the alkaline aluminate solution under controlled conditions such as to avoid reduction of the pH substantially below pH 9. The employment of an acidic aluminum salt, such as aluminum sulfate, has the further advantage that a part of the aluminum can also be added with the acidic reagent. An additional advantage is that when using an acidic aluminum salt for neutralizing the alumina is added without increasing the total amount of foreign salts in the slurry. Especially good results have been obtained by dividing the water required for the desired dissolution substantially equally between the alkaline aluminate solution and the solution of the acidic reagent.

(6) The rate of addition of the acidic reagent to the alkaline aluminate solution does not appear to be critical so long as the desired pH is maintained. Good results have been obtained by adding the acidic reagent, for example, an aluminum sulfate solution, either simultaneously or portionwise.

(7) The temperature of the reaction mixture during the precipitation can vary rather widely but in general should be above the freezing temperature and below the boiling point of water. Good results have been obtained at temperatures in the range of 40 to 140° F.

(8) If the precipitation has been effected at a low temperature and it is desired to filter the resultant slurry before drying, it has been found that heating the alumina slurry to a temperature within the range of 100 to 150° F., preferably about 120° F., is an aid to filtration. However, this is optional.

(9) The slurry containing the alumina in hydrous form, for example, as an alumina gel, is dried in such a manner as to form microspherical particles of the alumina or of an alumina-silica composition, as the case may be. This is preferably accomplished by spray drying. The spray drying temperature does not appear to be critical and can vary within the range of 200 to 1000° F. The temperature used will depend on such factors as the quantity of material to be dried and the quantity of air used in the drying. The evaporation rate will vary depending upon the quantity of air used in the drying. The temperature of the particles which are being dried is preferably within the range of 150 to 300° F. at the completion of the drying. A maximum particle temperature of 300° F. is desirable in order to avoid temperatures that would cause conversion of one form of aluminum to another. At approximately 302° F. the aluminum trihydrate is converted to the monohydrate. For some purposes, of course, the latter form of alumina may be desirable and in such event the drying can be effected under conditions sufficient to produce a temperature higher than 300° F. in the final dried particles. The drying is preferably effected by a process in which the particles to be dried and a hot air stream are moving in the same direction for the entire drying period. This is usually referred to as concurrent drying as distinguished from countercurrent drying, or drying of the type carried out in a cyclone apparatus. Concurrent drying has the advantage for the present invention that it gives large particles an opportunity to dry before they can adhere to the walls of the drier or to other particles.

The invention will be further illustrated but is not limited by the following examples in which the quantities are stated in parts by weight unless otherwise indicated.

EXAMPLE I

To 100 grams of a 55% sodium aluminate solution containing 34% $Al_2O_3$ and 24.8% $Na_2O$ made up to 1 gallon of solution there is added slowly 176 grams of aluminum sulfate solution containing .81 pounds of $Al_2O_3$ per gallon. The preparation is carried out at a temperature around 180° F. and all of the alumina is precipitated under relative alkaline conditions. The final slurry has a pH of about 10. The resultant product is filtered and the filter cake is dried at temperatures within the range of 150 to 300° F. to produce a hard glassy product. In the practice of the invention it has been found that the final form of the product can be determined by drying the filter cake without spray drying. It will be understood that this form of a product can be used as such for some purposes even though the product in the preferred form consists of microspherical particles.

EXAMPLE II (a) A solution of aluminum sulfate prepared by diluting 12 gallons of 25% aluminum sulfate containing 0.81% $Al_2O_3$ per gallon with 100 gallons of water was added in a 5 minute period to a solution of sodium aluminate prepared by adding 5 gallons of an aqueous sodium aluminate solution containing 71% $Na_2Al_2O_4$, 1.4% $Na_2CO_3$ and 2.1% excess NaOH to 200 gallons of water. The final slurry temperature was 86° F. The slurry was heated to 120° F. and filtered on a vacuum string discharge filter. The pH of the final slurry was 10.4. The filter cake dried to a continuous phase hard glassy solid.

(b) When the procedure described in Example II is carried out with 13½ gallons of the 25% aluminum sulfate solution containing 0.81% $Al_2O_3$ per gallon in 105 gallons of water the pH of the final slurry is 7.2 and the filter cake dries to a semi-glass containing opaque particles and hence characterized by several phases.

EXAMPLE III

The procedure is the same as Example II except that 1 quart of sodium silicate containing 28.8% $SiO_2$ and 9.1% $Na_2O$ is added to the sodium aluminate solution before the addition of the aluminum sulfate. The silica concentration in the resultant alumina-silica composition is approximately 3%. The final pH of the slurry is 10.2 and the filter cake dries to a hard glassy clear solid in which there are no discontinuous phases.

EXAMPLE IV (a) 200 parts of 25% aluminum sulfate was diluted to 1000 parts with water to make a solution containing 14.9 parts of $Al_2O_3$ and having a concentration of 1.49% with respect to alumina.

(b) 100 parts of the sodium aluminate solution described in Example I was diluted to 1300 parts with water to make a solution containing 34 parts of $Al_2O_3$ and having a concentration of 0.895% with respect to alumina.

To 300 parts of the dilute sodium aluminate solution (b) there was added enough dilute aluminum sulfate solution (a) to bring the resultant slurry to a pH of 9. After filtering the filter cake dries to a hard glassy material. However, the addition of the solution (a) to the solution (b) to give a pH of 6 in the resultant slurry when filtered produces a filter cake that does not dry to a glass but on the contrary dries to a white power. If ammonia is added to the above filter cakes to adjust them to a pH of 10 the filter cakes from both preparations will dry to a glass but the preparation that was prepared at a higher pH gives a stronger glass.

EXAMPLE V

To a solution obtained by diluting 30 grams of the sodium aluminate liquor described in Example I with 500 cc. of water there was added in approximately 5 minutes enough of a solution prepared by diluting 47 grams of 25% aluminum sulfate with 250 cc. of water to bring the final slurry to (a) pH 9.5
(b) pH 8.0

In the case of (a) when the slurry was filtered the filter cake dried to a continuous phase hard glassy solid. In the case of (b) however, when the slurry was filtered the filter cake did not exhibit such characteristics but dried to a powdery solid. The slurries in these preparations contained approximately 1.75% alumina.

EXAMPLE VI

Slurries were prepared by diluting the reactants in Example V to one-half of the concentration, that is, to give final slurries containing approximately 0.88% alumina. The slurries at this dilution of pH 10.2 and 8.9 both gave filter cakes that dried to a hard glassy solid.

EXAMPLE VII

To 30 grams of the sodium aluminate liquor described in Example I diluted with 250° cc. of water there was added in approximately 5 minutes enough of a solution made up by diluting 47 grams of aluminum sulfate with 126 cc. of water to end up with a pH of 10.2 in the resultant slurry. The filter cake obtained by suction filtration of this slurry dried readily to a hard glassy material.

Repetition of this procedure but carrying the addition of the aluminum sulfate to a pH of 8.8 in the final slurry gives a filter cake which on suction filtration dries to a glassy hard material of continuous phase. However, the filtering properties of the slurry are very poor.

These two preparations were conducted at an alumina concentration in the finished slurry of approximately 3.5%.

The analysis of Examples IV to VII indicates that when the slurries containing alumina are prepared at pH's greater than 10.0 higher concentrations of alumina can be tolerated and still obtain hard glassy continuous phase dried alumina. If a lower pH is used a higher dilution of the reactants must be employed in order to obtain the suitable filtering properties.

EXAMPLE VIII

The filter cake from the composition prepared as described in Example III was reslurried to a pumpable mixture containing 4 to 6% $Al_2O_3$ and spray dried to a final particle temperature within the range of 150 to 300° F. The resultant microspheres had the following characteristics:

*Chemical characteristics*

Volatile:
| | |
|---|---|
| at 150° C. _____percent__ | 24.5 |
| at 1800° F. _____do____ | 27.9 |
| $Na_2O$ _____do____ | 0.013 |
| $SO_4$ _____do____ | 0.42 |
| Fe _____do____ | 0.04 |
| $SiO_2$ _____do____ | 2.06 |
| Apparent bulk density _____ | .77 |
| Surface area square meters per gram_____ | 306 |

*Attrition characteristics*

| Percent On | 100 Mesh | 170 Mesh | 200 Mesh | 270 Mesh | 325 Mesh | Below 325 Mesh |
|---|---|---|---|---|---|---|
| As Is | 0.6 | 24.5 | 16.8 | 20.5 | 9.2 | 28.4 |
| 4 Hours | 0.2 | 15.1 | 17.4 | 22.1 | 11.3 | 33.9 |
| 8 Hours | trace | 14.7 | 18.7 | 23.8 | 8.9 | 33.9 |

When the product of Example II(b) was spray dried in a similar manner it showed very poor attrition resistance, so poor in fact that the particles were badly broken during the spray drying operation. In the spray drier that was used the particles passed through a fan before entering the collection system. In the case of the particles from Example II(b) there was not sufficient strength to stand the abrading action of the fan. On the other hand, the particles prepared in accordance with the present example were very good spherical particles with good attrition characteristics. This further illustrates that the pH during the formation of the alumina is an important factor governing the attrition characteristics of the resultant product.

Similar spray drying preparations were conducted with compositions made in accordance with this example but with other rates of addition of the reactants and also by using chemically equivalent quantities of aluminum chloride instead of the aluminum sulfate. The attrition characteristics of the resultant microspheres did not vary greatly from those of the present example.

EXAMPLE IX

To 200 gallons of Chicago tap water at 80° F. was added 5 gallons of sodium aluminate liquor containing 71% $Na_2Al_2O_4$, 1.4% $Na_2CO_3$ and 2.1% excess NaOH. The $Al_2O_3$ content of the sodium aluminate liquor was approximately 35% before the addition of the tap water. To the resultant solution was added a solution made up by diluting 12 gallons of 25% aluminum sulfate to 100 gallons with water. The aluminum sulfate solution was added to the sodium aluminate solution in 5 minutes and a final pH of 10.2 was obtained. The resultant slurry was then heated to 120° F. and filtered on a vacuum rotary filter. The filter cake was reslurried with water to a pumpable mixture and spray dried in the preferred manner previously described herein. After spray drying the material was washed by percolation with Chicago tap water until the excess alkalinity had been removed. The washers were then changed over to hot water and washed until the effluent water showed no sodium salts or sulfate salts. The material was then slurried in 2½% ammonia water and washed free of sulfates in the effluent water. At this point the chemical analysis showed the sulfate content to be .49% as $SO_4$. This material was then treated with sufficient ammonium molybdate dissolved in hot water to give a $MoO_3$ content of the thick slurry of 13%. After calcining at 350° F. the $MoO_3$ catalyst showed the following analysis:

| | |
|---|---|
| Moisture at 1800° F. _____ | 34.4 |
| $Na_2O$ _____percent__ | 0.01 |
| $SO_4$ _____do____ | 0.16 |
| Fe _____do____ | 0.09 |
| $SiO_2$ _____do____ | 0.5 |
| $MoO_3$ _____do____ | 13.1 |
| Surface area, square meters per gram _____ | 330 |

The alumina microspheres prior to the addition of the $MoO_3$ had the following attrition characteristics:

| Percent On | 100 Mesh | 170 Mesh | 200 Mesh | 270 Mesh | 325 Mesh | Below 325 Mesh |
|---|---|---|---|---|---|---|
| As Is | .4 | 2.8 | 5.7 | 21.1 | 14.4 | 55.6 |
| 4 Hours | trace | 1.6 | 4.2 | 16.6 | 19.9 | 57.7 |
| 8 Hours | trace | 1.6 | 3.7 | 15.8 | 14.1 | 64.8 |

EXAMPLE X

The procedure was the same as in Example IX except that the preparation of the composition was carried out at a temperature of 90° F. and the aluminum sulfate solution was added to the sodium aluminate solution during a period of 35 minutes. The final pH of the slurry was 10.3. The slurry was heated to 120° F. and filtered on a vacuum rotary filter. The filter cake was reslurried with sufficient water to form a pumpable mixture and then spray dried according to the preferred method previously described. The resultant alumina microspheres had the following attrition characteristics:

| Percent On | 100 Mesh | 170 Mesh | 200 Mesh | 270 Mesh | 325 Mesh | Below 325 Mesh |
|---|---|---|---|---|---|---|
| As Is | trace | 2.7 | 8.7 | 30.8 | 14.1 | 43.7 |
| 4 Hours | trace | 2.5 | 6.4 | 29.3 | 11.8 | 50.0 |
| 8 Hours | trace | 1.7 | 5.6 | 25.2 | 14.5 | 53.0 |

After spray drying the microspheres were washed to remove soluble sodium salts and treated with a 2½% ammonia solution. The resultant microspheres had the following characteristics:

| | |
|---|---|
| Moisture at 150° F. _____ | 27 |
| Moisture at 1800° F. _____ | 29.1 |
| $Na_2O$ _____percent__ | 0.012 |
| $SO_4$ _____do____ | 0.27 |
| Fe _____do____ | 0.10 |
| $SiO_2$ _____do____ | 0.25 |
| Surface area, square meters per gram _____ | 300 |

EXAMPLE XI

The procedure was the same as Example X except that the reaction was completed in 5 minutes instead of 35 minutes and the reaction temperature was 140° F. The final pH of the slurry was 10.4. The slurry was filtered, reslurried and washed to remove sodium salts. Thereafter the resultant microspheres were treated with ammonium molybdate in such quantity as to produce a final $MoO_3$ content of 9.3%. The characteristics of the product were as follows:

| | |
|---|---|
| Moisture at 1800° F. _____ | 36.2 |
| $Na_2O$ _____percent__ | 0.013 |
| $SO_4$ _____do____ | 0.1 |
| Fe _____do____ | 0.085 |
| $SiO_2$ _____do____ | 0.26 |
| $MoO_3$ _____do____ | 9.3 |
| Surface Area, square meters _____per gram__ | 361 |

The attrition characteristics of the alumina microspheres were as follows:

| Percent On | 100 Mesh | 170 Mesh | 200 Mesh | 270 Mesh | 325 Mesh | Below 325 Mesh |
|---|---|---|---|---|---|---|
| As Is | trace | 4.1 | 12.8 | 32.6 | 5.8 | 44.7 |
| 4 Hours | 0 | 2.6 | 10.6 | 28.0 | 12.3 | 46.5 |
| 8 Hours | 0 | 2.5 | 9.9 | 26.3 | 12.6 | 48.7 |

EXAMPLE XII

To 200 gallons of Chicago tap water at 85° F. was added 5 gallons of sodium aluminate having the composition described in Example I. To the resultant solution was added 50 pounds of aluminum chloride hexahydrate dissolved in 100 gallons of Chicago tap water. The aluminum chloride solution was added to the sodium aluminate solution until the pH of the slurry reached 10.3. This addition was made in approximately 5 minutes. The resultant slurry was heated to 120° F. and filtered by a vacuum rotary filter. The filter cake was reslurried to form a pumpable mixture and then spray dried.

The attrition characteristics of the resultant microspheres were as follows:

| Percent On | 100 Mesh | 170 Mesh | 200 Mesh | 270 Mesh | 325 Mesh | Below 325 Mesh |
|---|---|---|---|---|---|---|
| As Is | trace | 1.4 | 2.7 | 18.0 | 13.7 | 64.2 |
| 4 Hours | trace | 1.1 | 2.8 | 13.7 | 16.3 | 66.1 |
| 8 Hours | trace | 0.6 | 2.0 | 8.5 | 13.8 | 75.1 |

In the foregoing examples it will be noted that in some cases the products consist of alumina or combinations of alumina and silica which can be employed as a catalyst base or for other purposes where such compositions are useful. In other examples illustrations of the preparation of specific catalysts have been given. The use of small amounts of silica to stabilize an alumina base is known in the catalyst art and the present invention contemplates the preparation of catalysts consisting essentially of an activated alumina gel with or without the adition of about 1% to about 15% of silica and with or without the addition of well known catalytic agents.

The alumina herein described, or combinations of alumina and silica, can be employed in association with magnesia as a cracking catalyst. Thte alumina or alumina-silica base can also be used as a carrier for well known catalytic agents employed at catalytic cracking, dehydrogenation, hydrogenation, hydroforming, desulfurization, aromatization and reforming hydrocarbons. Among the catalytic agents which may be carried on alumina or alumina-silica catalyst bases prepared as herein described are the oxides and other compounds of the related metals which have their differentiating electron in the second from the outermost shell (see W.F. Luder, Jour. of Chem. Ed. 16:394 (1939) for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver lanthanum, platinum, thorium, mercury, uranium, gold, tungsten, cadmium, rhenium, tantalum, osmium, and actinium. The incorporation of these metals with the alumina base or the alumina-silica base of the type herein described can be effected by a suitable treatment of the base with the sulfates, chlorides, nitrates, molbdenates, vanadates, chromates and other suitable salts by impregnation, precipitation, co-precipitation with the alumina or according to methods well known in the art. The alumina or alumina-silica bases can also have incorporated therewith zirconia, titania and/or thoria.

The alumina or alumina-silica bases herein described are particularly suitable for use as carriers for the oxides or molecular combinations of chromium, molybdenum, cobalt and vanadium. As an illustration, a carrier consisting essentially of an alumina and silica gel of the type herein described can be used to support 1% to 12% of molybdenum oxide, the silica in the carrier constituting about 1% to 15% of the catalyst composition. Similar catalysts can be prepared containing as additional ingredients up to 10% of titania and/or iron oxide.

The attrition characteristics referred to in the examples were determined by tests similar to those described in Journal of Industrial and Engineering Chemistry, vol. 41, page 1200, June 1949.

From Example IV it will be noted that not only does the pH during the preparation of the alumina markedly affect the characteristics of the resultant product but also it has been found in accordance with this invention that the pH during drying will have a marked effect upon the physical characteristics of the resultant product. As an additional illustration, alumina precipitated by adding a dilute sodium aluminate solution to a dilute alum solution wherein the final adjusted pH is between 4 and 6 upon drying yields a powdery product. If, however, that slurry is adjusted to a pH of 9 to 10.5 before drying, the product will tend to be much more "glassy" and will compare more favorably, although not equal to, the product obtained by drying the preparation formed by adding alum to a sodium aluminate solution, maintaining the preparation on the alkaline side and adjusting to a pH of 9 to 10.5 without ever converting to an acidic condition.

The expression "alumina in hydrous form" is intended to cover the various states in which $Al_2O_3$ exists when combined with water.

The invention provides a method of preparing alumina or combinations of alumina and silica which are characterized by a clear, glass-like structure exhibiting continuity of phase. This structure has the advantage that it contains no opaque particles and no interfaces between different phases which would tend to produce a particle having poor attrition characteristics. It should also be pointed out that the glass-like microspheres which are produced in accordance with this invention exhibit true alumina gel characteristics such as high surface area, optimum pore volume, and correct density as differentiated from the glass-like fused alumina microspheres which have low surface area and otherwise undesirable physical characteristics. It will be appreciated that this is especially advantageous where the alumina or the combinations of alumina and silica are employed as catalysts or as carriers for catalysts in fluidized processes where the catalyst is maintained in suspension in the reactant vapors during the reaction.

This application is a continuation of my copending application Serial No. 301,981 filed July 31, 1952, now abandoned, which is incorporated in the present application in its entirety.

The invention is hereby claimed as follows:

1. A process for preparing alumina characterized by a clear, glass-like gel structure exhibiting continuity of phase which comprises precipitating alumina in hydrous form by adding to an aqueous alkaline aluminate solution a quantity of an inorganic acidic compound having an anion which forms salts with aluminum that are soluble in said alkaline aqueous solution, said acidic compound being from the group consisting of aluminum sulfate and aluminum chloride, effecting said precipitation at a temperature within the range of 40° F. to 180° F. with the concentration of alumina within the range of about 0.88% to 6% by weight, calculated as $Al_2O_3$, maintaining the pH during said precipitation within the range of 8 to about 12, controlling the temperature, concentration of $Al_2O_3$ and pH within the aforesaid ranges to produce a slurry of alumina which when filtered and dried contains the alumina in a continuous phase glass-like form, adjusting the solids concentration of the slurry to in excess of about 3.5% $Al_2O_3$, and then drying the resultant product.

2. A process as claimed in claim 1 wherein the final slurry is filtered, reslurried to a concentration of solids in excess of about 3.5% $Al_2O_3$ and then dried.

3. A process as claimed in claim 1 wherein an alkali soluble silicate is added to the alkaline aluminate solution in such amounts that the resultant product contains not more than 15% $SiO_2$ by weight.

4. A process for preparing alumina characterized by a clear, glass-like gel structure exhibiting continuity of phase which comprises adding an acidic aqueous solution of an aluminum salt from the group consisting of the sulfate and the chloride to an alkaline aqueous solution of sodium aluminate at a temperature within the range of about 40° F. to 140° F. with total concentrations of said aluminum salt and sodium aluminate within the range of 1.0% to 2.5% by weight, calculated as $Al_2O_3$, thereby precipitating alumina in hydrous form, the relative proportions of said aluminum salt and sodium aluminate being sufficient to produce a pH during said precipitation within the range of about 9 to about 10.5, controlling the temperature, concentration of $Al_2O_3$ and pH within said ranges to produce a slurry of alumina which when filtered and dried contains the alumina in a continuous phase glass-like form, increasing the concentration of the alumina solids in the slurry to from 4% to 7% by weight $Al_2O_3$, and spray drying the resultant product.

5. A process as claimed in claim 4 wherein the acidic aluminum salt is aluminum sulfate.

6. A process as claimed in claim 4 wherein the acidic aluminum salt is aluminum chloride.

7. A process as claimed in claim 4 wherein an alkaline silicate is added to the alkaline aluminate solution.

8. A process for producing alumina in hydrous form characterized by a clear, glass-like gel structure exhibiting continuity of phase which comprises adding a dilute aqueous aluminum sulfate solution to a dilute aqueous sodium aluminate solution at a temperature within the range of 40° F. to 140° F. thereby precipitating alumina, the concentration of the aluminum sulfate and the sodium aluminate being sufficient to produce a slurry containing 1.0% to 2.5% by weight $Al_2O_3$, maintaining the pH during said precipitation within the range of 9 to 10.5, controlling the temperature, concentration of $Al_2O_3$ and pH within the aforesaid ranges to produce a slurry of alumina which when filtered and dried contains the alumina in a continuous phase glass-like form, increasing the concentration of the alumina solids in the slurry to from 4% to 7% by weight $Al_2O_3$, and spray drying the resultant product.

9. A process as claimed in claim 4 wherein sodium silicate is added to the sodium aluminate solution in proportions sufficient to produce a final product containing 1% to 15% $SiO_2$.

10. Alumina microspheres in hard glass-like form characterized by continuity of phase and freedom from opaque particles, said microspheres being obtained by the process of claim 1.

11. Alumina-silica microspheres in hard glass-like form characterized by continuity of phase and freedom from opaque particles obtained by the process of claim 3.

References Cited in the file of this patent

UNITED STATES PATENTS

| | | |
|---|---|---|
| 2,386,810 | Marisic et al. | Oct. 16, 1945 |
| 2,398,610 | Bailey et al. | Apr. 16, 1946 |
| 2,435,158 | Read | Jan. 27, 1948 |
| 2,446,799 | Winding | Aug. 10, 1948 |
| 2,475,984 | Owen | July 12, 1949 |
| 2,548,860 | Bond | Apr. 17, 1951 |
| 2,657,115 | Ashley | Oct. 27, 1953 |